Jan. 7, 1958    K. O. BURKE    2,818,989
PALLET TRUCK
Filed July 25, 1956
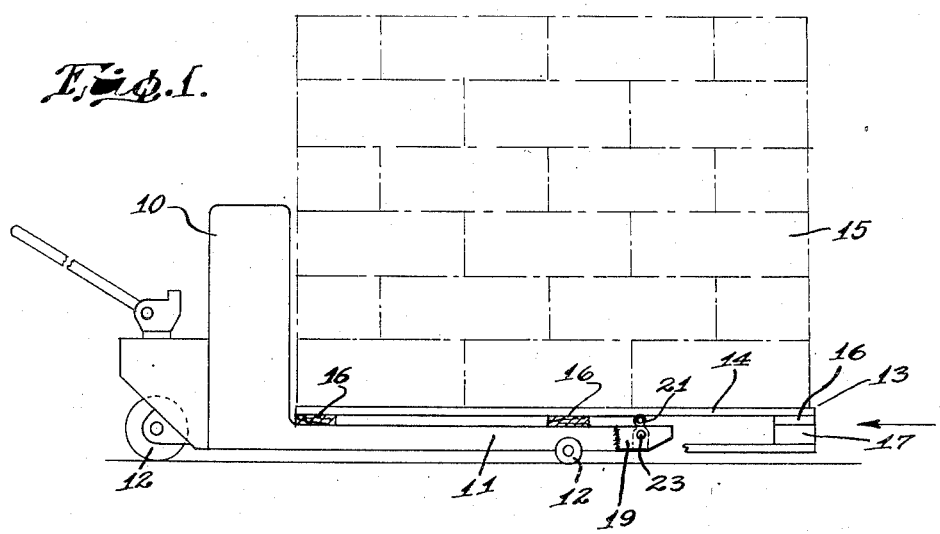
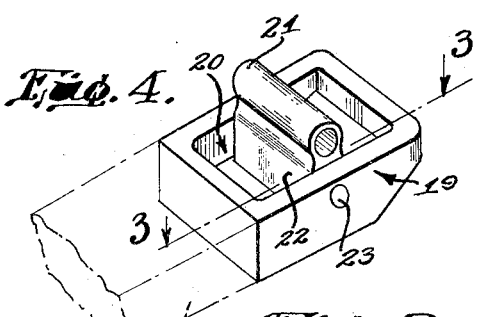
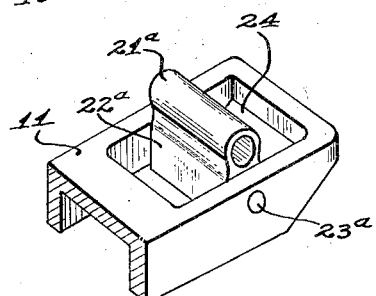
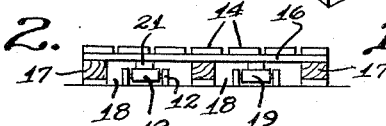
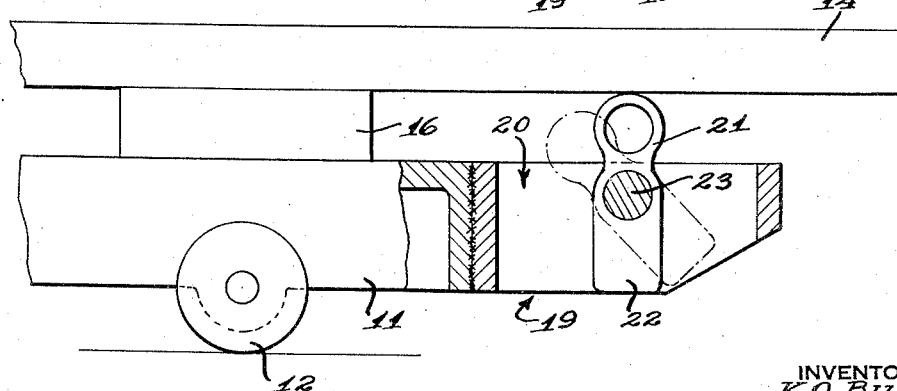
INVENTOR
K. O. BURKE
BY
Rule & Hoge
ATTORNEYS United States Patent Office 2,818,989
Patented Jan. 7, 1958

2,818,989
PALLET TRUCK

Kenneth O. Burke, San Leandro, Calif., assignor to Owens-Illinois Glass Company, a corporation of Ohio Application July 25, 1956, Serial No. 600,050

3 Claims. (Cl. 214—621)

The present invention relates to pallet trucks and more particularly to that type rather widely used in warehouses for lifting and transporting loaded pallets from one point to another for stacking them in rows or tiers. These trucks in general comprise a lifting frame carrying a plurality of tines or arms which are intended to be inserted in horizontally spaced passageways or openings formed in the conventional pallets. The length of these tines or arms heretofore has been determined by the dimensions of the pallet to be handled. Some styles of pallets are so constructed that they include three transverse boards or cross-members extending in a direction transverse to the length of the tines which must be brought into supporting contact with these boards preparatory to lifting and transporting the loaded pallet. Because of the uniform spacing apart of these cross members or boards, it has been necessary to utilize truck tines of such length that they will contact all three of the cross-members. Thus the length of the tines is equal to the full width of the pallets. A shorter set of tines which, for example, would contact only two of the cross-members would permit "rocking" or "teetering" of the pallet under certain conditions resulting in spillage or loss of goods stacked upon the pallet.

Another objection to use of these trucks in which the tines or arms are of substantial length, as explained above, is that they contribute to inefficient warehousing, necessitating wider aisles between tiers of palletized ware, such being the direct result of the need for greater turning space. Further, the longer the tines or arms, the greater the likelihood of "toeing in" or bending, either of which obviously entails costly repairs.

As object of my invention is the provision of simple inexpensive and efficient means for overcoming all of the above objections and reliably providing for material shortening of the truck arms or tines without losing any of the excellent load stabilizing characteristics of the longer tines or arms.

Another object of my invention is the provision of freely swingable stabilizing fingers in proximity to the forward or free ends of one or more of the truck tines together with counter-balancing means which permits, where necessary, movement of such finger to an inoperative position during insertion of the tines into the pallet passageways and then upright positioning of the fingers just prior to lifting of the tines into supporting contact with the pallet.

A further object of my invention is the provision of a load stabilizing device comprising a unitary carrying frame and counter-balanced swingable stabilizing finger capable of ready attachment to existing pallet trucks.

Other objects will be in part apparent and in part pointed out hereinafter.

In the drawings:

Fig. 1 is a side elevational view with parts in section showing a truck incorporating my invention and also supporting a loaded pallet.

Fig. 2 is a fragmentary end elevational view taken in the direction of the arrow at the right-hand side of Fig. 1.

Fig. 3 is a fragmentary vertical sectional view of the stabilizing device wherein it is shown as an accessory or attachment, such view being taken substantially along the line 3—3 of Fig. 4.

Fig. 4 is a perspective view of the stabilizing finger arrangement also shown in Fig. 3.

Fig. 5 is a fragmentary perspective view showing the stabilizing finger device formed as an integral part of one of the tines.

My invention, as explained above, may be either in the form of an accessory or attachment for existing fork trucks or, if preferred, can very well comprise a part of the original equipment. Also, as pointed out above, the lift fork or pallet truck is of conventional form including a liftable frame 10 and one or more tines 11 or arms which project forwardly and horizontally from the frame 10 in parallel spaced relationship in the fashion common to trucks of this character. Casters or wheels 12 facilitate propulsion of the truck. The pallet 13 may be of conventional, or any preferred form, and as illustrated, consists of an arrangement of cleats or strips 14 extending in the direction of the length of the tines 11 and providing a surface upon which cartons 15 or other articles may be stacked. These strips 14 are secured to three equally spaced cross-members 16 and these in turn are secured to relatively heavy base members 17 (Fig. 2) which are spaced apart providing parallel passageways 18 or openings designed to accommodate the tines 11 of the truck.

It will be observed, by reference to Fig. 1, that the medial cross-member 16 is substantially at the center of gravity of the pallet and any load that might properly be placed thereon. Consequently, in the absence of my invention, it would be necessary for the truck tines or arms to extend the full width of the pallet and engage the lower surfaces of all three cross-members 16. Otherwise, the pallet and load thereon could "rock" or "teeter," as explained heretofore and possibly result in at least partial unintentional unloading of the pallet or spillage of merchandise.

According to my invention, the tines 11 are of minimum length and extend only a short distance beyond the center cross-member 16 and at that point at least one of these tines has attached thereto, or incorporated in it as original equipment, stabilizing means which may assume an inoperative position during insertion of the truck tines into the passageways 18, but immediately thereafter assumes an operative position for engagement with the pallet upon initiating the upward lifting motion of the tines. In Figs. 1 through 4, the stabilizing device is shown as an attachment or accessory and comprises an open frame 19 of generally rectangular form having a vertical opening 20 therethrough. This frame may be welded or otherwise secured to the forward end of one of the tines 11. A pivoted swingable supporting finger 21 and an integral, depending, counterbalance 22 or counterweight are carried by a hinge pin 23, this pin being mounted in the frame 19 with its axis extending transverse to the length of the tine 11. It is apparent that with this arrangement the finger 21 normally is in its uppermost or upright position, as shown in full lines in Fig. 3, but is free to swing in either direction about the pivot pin 23 incident to projection of the truck tines or arms into or out of operative relation to the pallet. This finger, as will be observed, normally projects above the top surface of the tine 11 a distance approximating the thickness of the cross-members or boards 16. Since, in adidtion, the finger firmly engages the pallet at a point beyond the center of gravity (Fig. 1), it very obviously effectively prevents any such rocking of the pallet and load as has been referred to herein.

In Fig. 5, I have shown the stabilizing device as comprising original equipment and to this end the tine 11 itself is formed with a rectangular vertical opening 24 to accommodate the finger 21a, counterweight 22a and the supporting hinge pin 23a.

Modifications may be resorted to within the spirit and scope of the appended claims.

I claim:

1. In a pallet lifting and supporting truck comprising a liftable frame, a plurality of horizontal parallel spaced tines projecting forwardly from the frame, said tines designed for supporting engagement with a medial cross-member of a pallet, said member extending in a direction generally transverse to the length of the tines at a point near the free end of the latter end at substantially the center of gravity of the pallet; the improvement which comprises a swingable load stabilizing finger pivoted to one of the tines at a point forwardly of the cross-member and engageable with the pallet and a counterbalance operable normally to position the finger in supporting contact with the pallet.

2. Apparatus as defined in claim 1, each finger carrying tine having a vertical opening substantially at its forward end to accommodate the finger and counterbalance and a hinge pin supporting the finger and counterbalance and positioned in the opening with its axis disposed transverse to the length of the tine.

3. Apparatus as defined in claim 1, an open frame member carrying the load stabilizing finger and means securing the frame to the free end of a tine.

References Cited in the file of this patent

UNITED STATES PATENTS

| | | |
|---|---|---|
| 1,105,631 | Drain | Aug. 4, 1914 |
| 2,448,944 | Woodward | Sept. 7, 1948 |
| 2,570,726 | Smith | Oct. 9, 1951 |
| 2,639,829 | Dempster et al. | May 26, 1953 |